April 23, 1957 — R. J. HALL ET AL — 2,789,738
SCREW CONVEYOR
Filed Nov. 24, 1953 — 3 Sheets-Sheet 1
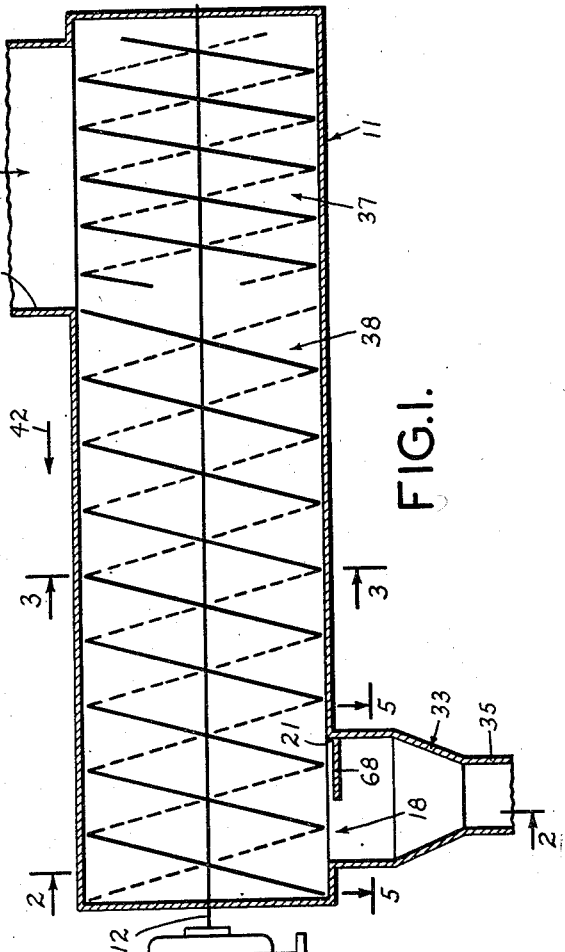
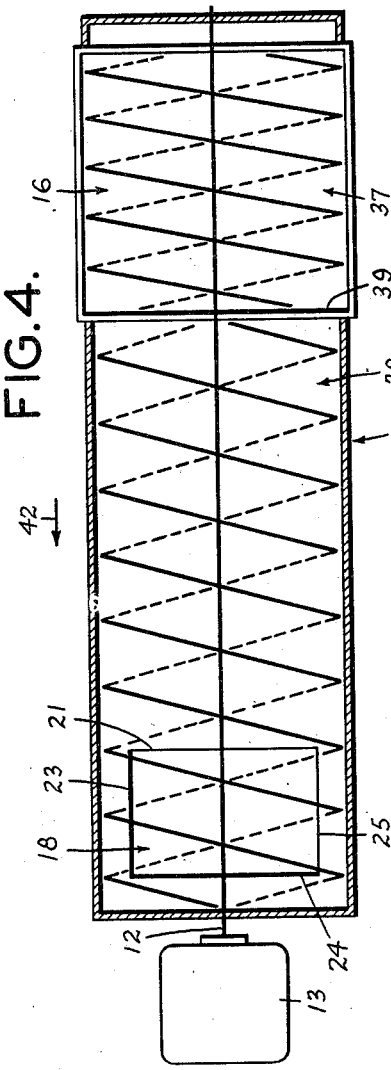
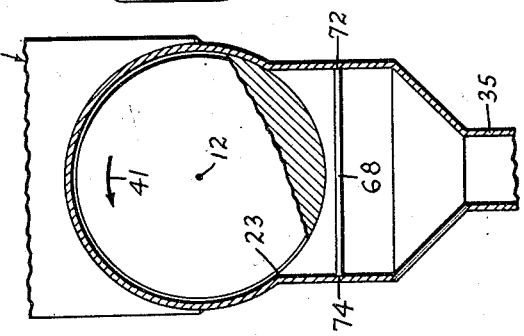
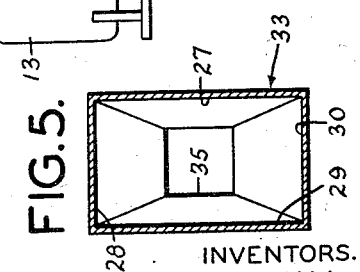
INVENTORS.
ROBERT J. HALL
JULIUS W. NEELLEY
BY
ATTORNEY.

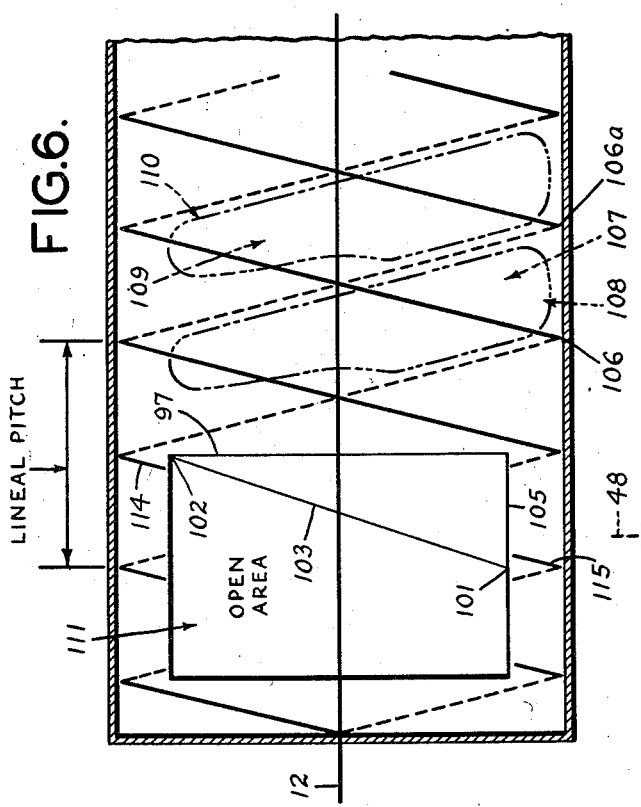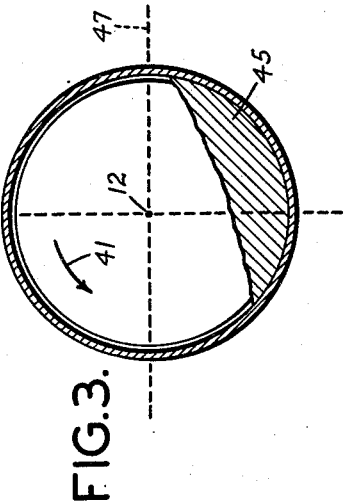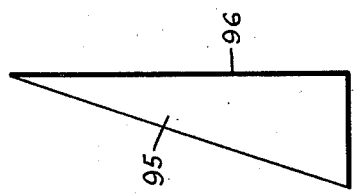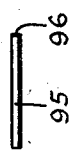

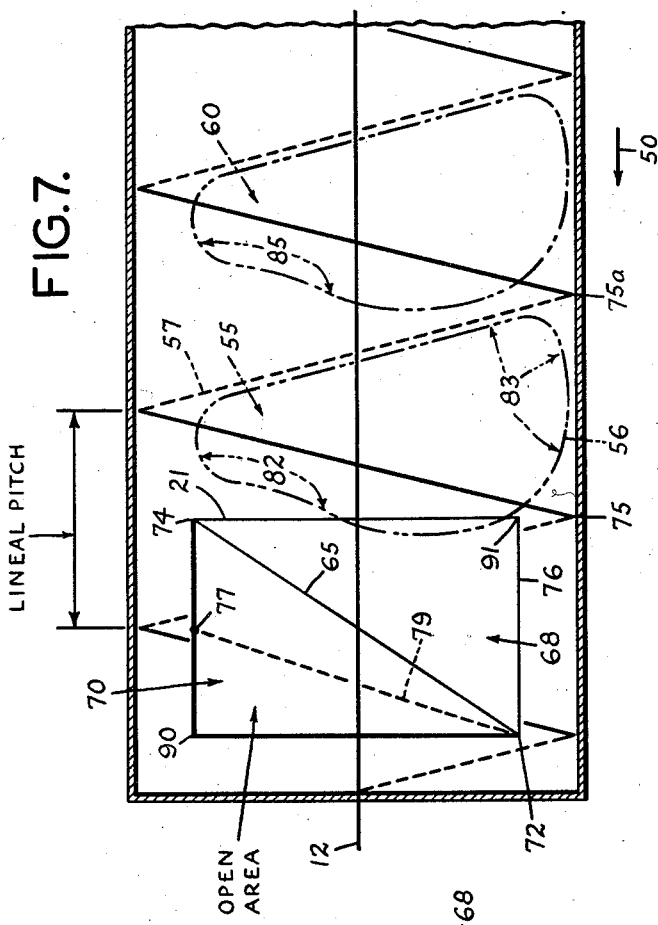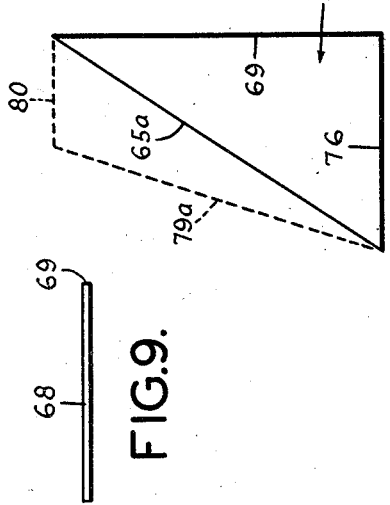

United States Patent Office 2,789,738
Patented Apr. 23, 1957

2,789,738

SCREW CONVEYOR

Robert J. Hall, Pulaski, Va., and Julius W. Neelley, Glen Rock, N. J., assignors to Allied Chemical & Dye Corporation, New York, N. Y., a corporation of New York Application November 24, 1953, Serial No. 393,978

6 Claims. (Cl. 222—413)

This invention relates to screw conveyors, and is more particularly directed to provision of improvements affording substantially uniform and non-pulsating rates of discharge from the conveyor of the material conveyed.

The invention and the objects and advantages thereof will appear from the following description taken in conjunction with the accompanying more or less diagrammatic drawings, in which:

Fig. 1 shows a front elevation of a screw conveyor embodying improvements hereof;

Fig. 2 is an end view taken approximately on the line 2—2 of Fig. 1;

Fig. 3 is a similar end view taken approximately on the line 3—3 of Fig. 1;

Fig. 4 is a plan view of the apparatus of Fig. 1;

Fig. 5 is a horizontal cross-section taken on the line 5—5 of Fig. 1;

Fig. 6 is an enlarged plan view similar to the left end of Fig. 4 and showing a preferred embodiment;

Fig. 7 is an enlarged plan view, similar to Fig. 6, and illustrating another form of the invention;

Fig. 8 is a plan view of an inset plate or material discharge surface which may be employed in conjunction with the apparatus of Fig. 7 and which may be utilized to readily and inexpensively adapt existing equipment to embody the improvements of the invention;

Fig. 9 is a bottom edge view of Fig. 8;

Fig. 10 is a plan view of another inset plate or material discharge surface particularly adaptable for use in the apparatus of Fig. 6;

Fig. 11 is a bottom end view of Fig. 10, and

Fig. 12 is a graph hereinafter discussed.

Figs. 1 and 2 of the drawing illustrate a horizontally disposed material carrying trough or tube 11, and a horizontally disposed drive shaft 12. The term "horizontal" is used herein in a relative sense as a basis for reference, it being understood that the trough and shaft may be actually horizontal or e. g. downwardly inclined toward the trough outlet end. The apparatus also includes a source of power such as a motor 13 to rotate shaft 12, an inlet port 16 at the right or rearward or upstream end of the trough for introduction of e. g. granular or pulverulent solid material from a suitable supply bin not shown, and an outlet port, designated at 18, and located in the bottom of the opposite or forward or downstream end of trough 11 to afford discharge of material therefrom. Outlet port 18 (Fig. 4) appears rectangular in plan, and is bounded by material feed-off edge 21 and by three other edges 23, 24 and 25, all four of such edges being formed by respective intersections with the semi-cylindrical bottom of the trough of the four vertical sides 27, 28, 29 and 30 of discharge hopper 33 which terminates in an outlet conduit 35 for conducting material to a point of use, e. g. a device to form a gaseous suspension of material and to charge such suspension into a reaction chamber not shown. Since all of the foregoing equipment may be considered as representative of conventional apparatus, further detailed description is unnecessary.

As illustrated in Figs. 1 and 4, mounted on shaft 12 are two sections 37 and 38 of screw conveyors, section 37 being positioned under inlet port 16, and section 38 lying within the trough or tube 11. Section 38 occupies substantially entirely that portion of the trough to the left of left-hand boundary edge 39 of the inlet port 16. One invention feature, which contributes materially to the overall improved results, is that the pitch of the flight or flights of section 38 has a higher percent value than the pitch of the flight or flights of section 37. In this specification and appended claims, the term "percent pitch" is utilized in accordance with the accepted meaning in the art, that is, if a screw conveyor has a diameter of one foot and a flight is mounted so that one complete revolution of the shaft theoretically conveys the material one foot horizontally, the percent pitch of such flight is 100 percent. Similarly, if a given percent pitch is specified as 50%, this indicates that the arrangement of the flight on the shaft is such that on one complete shaft revolution, material is theoretically moved horizontally a distance of one-half foot. Hence, in the apparatus of Figs. 1 and 4, since percent value of the pitch of the flight or flights of section 38 preferably is higher than the percent value of the pitch of the flight or flights of section 37, it will be understood that in the entire portion of the trough to the left of inlet port edge 39 material is being conveyed faster than material being moved by the flight or flights of inlet port 16. This feature prevents bridging, plugging and stoppages of flow in the trough in the zone immediately beneath port 16. In practice of this invention, flight percent pitch of section 38 is usually appreciably less than 100%, and is preferably about 50%, in which case percent pitch of section 37 flights is about 40%. Also, in this specification and appended claims, the actual distance, in axial direction, between two corresponding points on a given flight, is referred to as "lineal pitch" as illustrated in Figs. 6 and 7 of the drawing.

The embodiment of Figs. 1 and 4 is shown with double flights of left-hand screws. As known in the art, a convenient way to determine the "hand" of a screw conveyer is for the observer to face the conveyer as viewed in front elevation in Fig. 1. If the near edges of the flights slope downwardly to the left, such flights are left-hand flights. In Fig. 1, and also in Fig. 4, the near edges of the flights are shown in solid lines and the far edges in dotted lines. As viewed from the left ends of Figs. 1 and 4, rotation of shaft 12 is counter-clockwise, as indicated by the arrows 41 of Figs. 2 and 3, to effect forward movement of material in the direction of arrows 42 of Figs. 1 and 4.

The substantially uniform and non-pulsating material discharge feed rate advantages afforded by the invention may be best appreciated by understanding of the non-uniform and pulsating discharge feed rate disadvantageous characteristics of conventional equipment, which disadvantages may be seen from consideration particularly of Figs. 3, 7 and 4. Referring to Fig. 3, it will be understood that in screw conveyors of the type in question, for rotation in a given direction, e. g., the arrow 41 of Fig. 3, the material being conveyed mows-up markedly on the side of the trough as a result of appreciable material flow tendency in the direction of rotation as indicated approximately by the shaded area 45 of Fig. 3. Thus, for convenience that portion of the trough beneath the dotted horizontal line 47 and to the right of dotted vertical line 48 may be designated (in relation to the direction of rotation indicated) as a "mow-up" zone, and that portion of the trough beneath line 47 and to the left of line 48 may be referred to as a "non-mow-up" zone.

Referring to Fig. 7, assuming as shown that the flights are left-handed and shaft 12 is rotated counterclockwise (viewing Fig. 7 from the left) to effect movement of the material in the direction of arrow 50, practice demonstrates that on the underside of the shaft and between two adjacent flights the material mows up as indicated in Fig. 3 and also forms a mound of material indicated generally at 55, Fig. 7, which mound in plan appears approximately as within the dot-dash line 56. As the shaft rotates, the under-section 57 of a flight in effect moves the mound 55 to the left, and it will be seen that when, as in the prior art the material feed-off edge of the discharge port is delineated by a line such as 21 (Fig. 7 and Fig. 4) lying at about a right angle to the shaft, the mound 55 is flopped off discharge edge 21 substantially in a broadside fashion so that practically all the mound is discharged over edge 21 suddenly and as a substantially unitary incremental body. Shortly thereafter practically substantially no material is fed over edge 21 because of the break between mound 55 and following mound 60, such break being caused by the presence of the underside 57 of a flight. The practical result is that successive substantially individual and separate small piles or mounds of material are discharged over edge 21 which action causes markedly intermittent and pulsating discharge of material into the collecting hopper underneath the material discharge port 18, Fig. 1. Thus, in graph form discharge of material is a series of pronounced peaks and valleys as indicated diagrammatically in Fig. 12. The apparatus of the present improvements is such as to substantially flatten the graph line 62.

Applying the discoveries of the invention to apparatus and mode of operation substantially the same as above discussed in connection with Fig. 7, it has been found that if the feed-off edge—instead of lying at a substantially right angle to shaft 12 as in the case of edge 21 Fig. 7—is disposed at an angle such that the feed-off edge broadly speaking lies at an angle directionally generally similar to a line or feed-off edge 65 Fig. 7, pulsations of material discharge may be minimized or substantially eliminated. To simplify illustrative discussion, it is assumed the feed off edges mentioned herein are straight lines, although it will be understood such feed-off edges may in fact be straight lines as shown and described herein, or may be actually downwardly bowed lines conforming with the curvature or other configuration of the bottom of the trough in which latter case, however, it will be understood that a downwardly bowed line lying in a vertical plane appears in plan as a straight line and a horizontal projection of such downwardly bowed line is a straight line.

In the embodiment of Fig. 7, material feed-off edge 65 is formed by and corresponds to edge 65a, Fig. 8, of an inset plate or material discharge surface 68 shown in plan in Fig. 8 and in end view in Fig. 9. Plate 68 may be set into the rectangular (in plan) upper end of material discharge port 18 of conventional apparatus so that edge 69 obliterates feed-off edge 21, Fig. 7, above discussed, positioning of inset 68 being shown in plan in Fig. 7, in end elevation in Fig. 2 and in vertical section in Fig. 1. Thus, it will be apparent that this plate insertion in effect prolongs, in shelf-like fashion, one side of the trough bottom in the direction of the trough outlet end, eliminates use of edge 21, Fig. 7, as the feed-off edge, and forms a new feed-off edge 65 which then delineates the upstream side of the discharge port 70 indicated in Fig. 7 as open area.

Material feed-off edge 65, Fig. 7, has a starting point 72 which is located adjacent the outlet end of the trough, subjacent material in the trough as indicated at 72 Fig. 2, and also subjacent to the mow-up zone of the trough corresponding to a given direction of rotation also as indicated at 72 Fig. 2. From starting point 72 feed-off edge 65 extends in generally upstream direction and terminates at an ending point 74 located in substantially the same horizontal plane as the starting point, and subjacent to the non-mow-up zone of the trough, and a substantial axial distance upstream from starting point 72, location of ending point 74 being shown in Fig. 7.

The axial (axial with respect to shaft 12) distance between starting point 72 and ending point 74 while subject to considerable variation, is an important factor of all phases of the instant improvements. In the embodiment of Fig. 7, this axial distance is the same as the length of edge 76 of inset plate 68. In accordance with the invention, it has been found that where there is any substantial axial distance between starting point 72 and ending point 74 significant improvements with respect to non-pulsating discharge of material thru open area 70 may be obtained. Thus, the ending point of the material feed-off edge 65 may be located for example as at 77 in which instance the feed-off edge would be positioned in plan along dotted line 79. In this situation, if a plate similar to plate 68 were employed, such plate in plan would have the configuration of the area bounded by lines 76, 69, 80 and 79a Fig. 8.

However, in most circumstances, the axial distance should be substantially greater than the axial distance between starting point 72 and e. g. the location of point 77 of Fig. 7. In order to obtain more notably the improved results afforded by the invention, it is desirable that the axial distance between starting and ending points of the material feed-off edge be at least equal to or greater than the axial lineal distance between corresponding points on the circumferences of two immediately adjacent screw ribbons. Thus in Fig. 7, it will be noted that the ending point 74 of edge 65 is located upstream from the starting point 72 an axial distance which is at least equal to the axial lineal distance between e. g. points 75 and 75a on the circumferences of two immediately adjacent screw ribbons. Since the conveyor of Fig. 7 has only a single flight screw, it will be understood that in this particular situation immediately adjacent screw ribbons are part of a common screw flight and that the distance between 75 and 75a is the same as the lineal pitch of the flight. The axial distance between feed-off edge starting and ending points 72 and 74 may be greater than the indicated preferred minimum, and we find that, if such distance is more than the indicated preferred minimum, no practical advantages are served if such distance is more than about 75% to 100% greater. All of the foregoing described factors are characteristic of all embodiments of the invention.

In the operation of the arrangement as shown in Fig. 7, assuming feed-off edge 65 is to be approximately in the position shown, it will be apparent that as mound 55 moves toward edge 65 the portion of the mound roughly indicated at 82 begins to spill off over the near and upstream end of edge 65 and thereafter the material of mound 55 drops over edge 65 in practically evenly distributed quantities. By the time about half of mound 55 has dropped over edge 65 and the trailing portion of mound 55 indicated at 83 approaches edge 65, the more or less leading edge 85 of following mound 60 will have begun to spill over the near and upstream end of edge 65. Hence, it will be seen that during operation at any given instant a substantial portion of each of two mounds of material is being spilled over edge 65, and a substantially continuous even volumed amount of material is being discharged over edge 65, the result being that the material is fed at a substantially uniform and non-pulsating rate into the hopper beneath the trough outlet port, e. g. port 70 of Fig. 7. Practice demonstrates that curve 62 of Fig. 12 is flattened practically to a straight line.

In the embodiment of Fig. 7, it will be noted that the starting point of feed-off edge 65 is downstream with respect to the axial location of ending point 74 and also that the downstream starting point 72 is subjacent the mow-up zone of the trough. In all embodiments of the invention, regardless of the "hand" of the flight or flights of the screw, or of the particular direction of rotation of the shaft which may be necessary to effect movement of material to the discharge end of the trough, the starting point 72 of the feed-off edge is always located downstream of the ending point 74 and is always subjacent the mow-up zone in the trough. Correspondingly, the feed-off edge ending point 74 is always upstream of the starting point 72 and is always located subjacent the non-mow-up zone of the trough.

It will be understood from Figs. 2 and 3 that the location of the mow-up zone is dependent upon the direction of rotation of the drive shaft. Thus, in Fig. 3 if the "hand" of the flight in the trough should be such as to require rotation of shaft 12 in a direction opposite to arrow 41, the mow-up zone in the trough would be in the quadrant below horizontal line 47 and to the left of the vertical line 48. Additionally, it will be appreciated that if shaft 12 of Fig. 3, and of Fig. 7 (viewed from the left end) were rotated clockwise, instead of counterclockwise as previously described, with the exception of movement of material toward the discharge end of the trough, all factors of operation, and the positioning of feed-off edge 65 would be reversed, namely, feed-off line 65 would start as at 90 and terminate as at 91 Fig. 7.

Fig. 6 illustrates a preferred embodiment of the invention involving the use of multiple screw flights at least adjacent the trough outlet end. Inset plate 95, Fig. 10, corresponds roughly with plate 68 of Fig. 8. Plate 95 may be set into the discharge port 18 so that plate edge 96 obliterates conventional feed-off edge 97 of Fig. 6, i. e. similarly to the previously described setting of plate 68 of Fig. 8 in position in the apparatus of Fig. 7. It will be seen that the locations of starting point 101 and ending point 102 of newly formed feed-off edge 103 correspond roughly with the locations of starting and ending points 72 and 74 of the embodiment of Fig. 7.

When employing multi-flight screws, the previously described principles regarding axial spacing apart of the feed-off edge starting and ending points is the same as above described, namely, the feed-off edge ending point is axially upstream of the starting point a distance at least equal to the axial lineal distance between corresponding points on two immediately adjacent screw ribbons. This mode of definition is based on the lineal distance between corresponding points on two immediately adjacent screw ribbons regardless of whether such ribbons are part of a single flight (in the case of the single flight screw) or whether such immediately adjacent ribbons are the ribbons of two different but adjacently placed screw flights. Thus in Fig. 6 the axial distance between feed-off edge starting point 101 and ending point 102 is represented by the line 105 which in length is about equal to the distance between points 106 and 106a which although on separate flights are corresponding points on two immediately adjacent screw ribbons.

The foregoing arrangement with regard to double flight screws provides feed-off conditions similarly to those described in connection with Fig. 7. In the embodiment of Fig. 6, when about the trailing half portion 107 of mound 108 is approaching and partly on the downstream portion of feed-off edge 103, about the leading half portion 109 of following mound 110 will already have begun to discharge over the near and upstream end of feed-off edge 103. The relatively uniform and non-pulsating characteristics of the spill of material over feed-off edge 103 are substantially accentuated and improved by the use of multiple flight screws. A further advantage is that the actual length of distancing line 105 can be shortened thereby affording, within the limitations of the particular piece of apparatus, a relatively large open area 111 for discharging material into the subjacent collecting hopper.

The proper axial distancing between a feed-off edge starting point and its ending point may also be described in terms of lineal pitch of a given flight, the lineal pitch of a given flight having been heretofore defined and also illustrated in Figs. 6 and 7 of the drawing. When referring to the axial distance between the feed-off edge starting point and ending point in terms of lineal pitch of a given flight in the conveyor it may be said that the ending point is axially spaced upstream from the starting point an axial distance which is at least equal to lineal pitch of a given flight multiplied by a value which is the reciprocal of the number of flights. That is, with reference to a single flight screw (Fig. 7), the axial distance between starting point 72 and ending point 74 is the indicated lineal pitch of a single flight multiplied by a value which is the reciprocal of the number of flights, such value in this instance being unity and the resulting distance being equal to the lineal pitch itself. Similarly, in the case of a double flight (Fig. 6), axial distance represented by 105 is and should be at least equal to half the lineal pitch of a given flight, and in the case of a triple flight screw not shown, an axial distance corresponding with axial distance 105 should be at least one third of the lineal pitch of a given flight. It will be understood that in multi-flight conveyors of the type under consideration the lineal pitches of the two or more flights are always the same.

Use of multi-flight screws, especially double flight, is preferred particularly because multi-flights, in addition to enhancing overall smoothness of operation and best results, afford the additional advantage of facilitating good approximation of proper location of the feed-off edge. Acceptable and advantageous results may be obtained when the material feed-off edge is so positioned that the edge or a horizontal projection thereof is a line which is generally or substantially parallel to the horizontal projection of the topside 180° of a flight portion designated by the line 114—115 Fig. 6.

The invention has been described with particular reference to the inert plates 68 and 95 of Figs. 8 and 10 to show how already existing equipment may be inexpensively modified to incorporate the principles of the invention. However, it will be understood that use of particular plates such as 68 and 95 is unnecessary, in that the material feed-off edges of the invention may just as well be formed by proper cut-outs made in the bottom of the conveyor trough at the time of fabrication of the apparatus.

We claim:

1. A conveyor assembly comprising a trough having a material inlet end and a material outlet end, a longitudinal axially disposed drive shaft carrying in said trough at least one screw flight adapted on rotation in a given direction to carry material from said inlet end to said outlet end, a material discharge port at substantially the bottom of said trough adjacent said outlet end, said port being delineated on the upstream side by a material feed-off edge the horizontal projection of which is substantially a straight line; said edge beginning at a starting point—located, adjacent said outlet end, and subjacent material in said trough, and subjacent the mow-up zone of said trough corresponding to said given direction of rotation, and extending in generally upstream direction and terminating at an ending point—located, subjacent the non-mow-up zone of said trough, and an axial distance upstream at least equal to the axial lineal distance between corresponding points on two immediately adjacent screw ribbons.

2. The assembly of claim 1 in which said ending point is located substantially in the same horizontal plane as the starting point.

3. The assembly of claim 1 in which the said axial distance upstream is at least equal to lineal pitch of a flight multiplied by a value which is the reciprocal of the number of flights.

4. The assembly of claim 1 in which the said shaft is provided at least adjacent the trough outlet end with multiple screw flights of the same lineal pitch, and in which said axial distance upstream is at least equal to lineal pitch of a flight multiplied by a value which is the reciprocal of the number of flights.

5. The assembly of claim 1 in which the said shaft is provided at least adjacent the trough outlet end with double screw flights of the same lineal pitch, and in which said axial distance upstream is at least equal to the axial lineal distance between corresponding points on two immediately adjacent screw ribbons.

6. The assembly of claim 1 in which the said axial distance upstream is not more than 100% greater than the axial lineal distance between corresponding points on two immediately adjacent screw ribbons.

References Cited in the file of this patent
UNITED STATES PATENTS

| | | |
|---|---|---|
| 2,352,749 | Wills | July 4, 1944 |
| 2,682,332 | Isbell | June 29, 1954 |